United States Patent [19]
McGarth et al.

[11] Patent Number: 5,897,932
[45] Date of Patent: Apr. 27, 1999

[54] ENHANCED INSULATION PANEL

[75] Inventors: Ralph McGarth, Granville; Ralph Jutte, Hebron, both of Ohio

[73] Assignee: Owens Corning Fiberglas Technology, Inc., Summit, Ill.

[21] Appl. No.: 08/922,110

[22] Filed: Aug. 28, 1997

Related U.S. Application Data

[63] Continuation of application No. 08/533,026, Sep. 25, 1995, abandoned.

[51] Int. Cl.$^6$ .............................. B32B 1/06; B32B 3/10; B32B 5/18
[52] U.S. Cl. ........................... 428/69; 428/192; 428/194; 220/421; 220/420
[58] Field of Search ............................... 428/69, 76, 192, 428/194; 220/420, 421; 312/406

[56] References Cited

U.S. PATENT DOCUMENTS

| | | | |
|---|---|---|---|
| 1,321,097 | 11/1919 | Gonzalez | 312/214 |
| 1,889,214 | 11/1932 | O'Leary | 312/214 |
| 2,067,015 | 1/1937 | Munters | 154/44 |
| 2,164,143 | 6/1939 | Munters | 220/9 |
| 2,240,487 | 5/1941 | Benham | 139/34 |
| 2,304,757 | 12/1942 | Arthur | 220/14 |
| 2,451,286 | 10/1948 | Heritage | 62/89 |
| 2,728,958 | 1/1956 | King | 20/35 |
| 2,741,341 | 4/1956 | Anderson | 189/2 |
| 2,768,046 | 10/1956 | Evans | 312/214 |
| 2,912,725 | 11/1959 | Ries | 52/809 |
| 3,078,003 | 2/1963 | Kesling | 220/9 |
| 3,179,549 | 4/1965 | Strong et al. | 428/75 |
| 3,273,297 | 9/1966 | Wehe | 52/784.15 |
| 3,462,897 | 8/1969 | Weinrott | 52/169 |
| 3,791,090 | 2/1974 | Kniefel | 52/593 |
| 3,819,466 | 6/1974 | Winfield et al. | 52/618 |
| 3,979,869 | 9/1976 | Beehler | 52/514 |
| 4,087,143 | 5/1978 | Barnard et al. | 312/138 R |
| 4,155,482 | 5/1979 | Swaney | 220/145 |
| 4,190,305 | 2/1980 | Knight et al. | 312/214 |
| 4,282,687 | 8/1981 | Teleskivi | 49/503 |
| 4,335,831 | 6/1982 | Swaney | 220/901 |
| 4,441,301 | 4/1984 | Benson | 52/804 |
| 4,463,043 | 7/1984 | Reeves et al. | 428/68 |
| 4,492,725 | 1/1985 | Ishihara et al. | 428/76 |
| 4,513,041 | 4/1985 | Delluc | 428/69 |
| 4,557,091 | 12/1985 | Auer | 52/282 |
| 4,589,240 | 5/1986 | Kendall et al. | 52/309.11 |
| 4,610,115 | 9/1986 | Thompson et al. | 52/171 |
| 4,671,979 | 6/1987 | Adiletta | 428/74 |
| 4,681,788 | 7/1987 | Barito et al. | 428/68 |
| 4,798,753 | 1/1989 | Abuaf et al. | 428/69 |
| 4,808,457 | 2/1989 | Kruck et al. | 428/69 |
| 4,878,258 | 11/1989 | Casey | 5/420 |
| 4,922,674 | 5/1990 | Thorn | 52/309.15 |
| 4,955,675 | 9/1990 | Donaghy | 312/214 |
| 5,007,226 | 4/1991 | Nelson | 52/809 |
| 5,011,729 | 4/1991 | McAllister | 428/167 |
| 5,048,233 | 9/1991 | Gidseg et al. | 49/501 |
| 5,082,335 | 1/1992 | Cur et al. | 312/401 |
| 5,090,981 | 2/1992 | Rusek, Jr. | 65/4.4 |
| 5,094,899 | 3/1992 | Rusek, Jr. | 428/69 |
| 5,107,649 | 4/1992 | Benson et al. | 52/309.4 |
| 5,115,612 | 5/1992 | Newton et al. | 52/208 |
| 5,273,801 | 12/1993 | Barry et al. | 428/69 |
| 5,316,171 | 5/1994 | Danner, Jr. et al. | 220/423 |
| 5,330,816 | 7/1994 | Rusek, Jr. | 428/69 |
| 5,355,645 | 10/1994 | Farag | 52/235 |
| 5,363,611 | 11/1994 | Richardson et al. | 312/116 |
| 5,398,510 | 3/1995 | Gilley et al. | 62/3.6 |
| 5,497,589 | 3/1996 | Porter | 52/784.15 |

FOREIGN PATENT DOCUMENTS

| | | |
|---|---|---|
| 149603 | 1/1952 | Australia . |
| 0542501 | 5/1993 | European Pat. Off. . |
| 2115583 | 7/1992 | France . |

*Primary Examiner*—Alexander Thomas
*Attorney, Agent, or Firm*—C. Michael Gegenheimer; Stephen W. Barns

[57] ABSTRACT

An enhanced thermal insulation vacuum panel is provided. The enhanced panel comprises a thermal insulation vacuum panel formed in part by an envelope having an outer periphery and framing structure secured to at least a portion of the outer periphery of the panel.

18 Claims, 1 Drawing Sheet

ENHANCED INSULATION PANEL

CROSS REFERENCE TO RELATED APPLICATIONS

This application is a file wrapper contionuation application of U.S. patent application Ser. No. 08/533,026, abandoned, which is related to contemporaneously filed U.S. patent application Ser. No. 08/533,025, abandoned, titled "Appliance Door," by Ralph McGrath et al., having attorney docket number 23858/23857, herein incorporated by reference; and is related to contemporaneously filed U.S. Patent Application, titled "Modular Insulation Panels and Insulated Structures," by Ralph McGrath et al., having attorney docket number 23845/23855, herein incorporated by reference.

TECHNICAL FIELD

This invention relates generally to an insulation panel having a frame, preferably formed of a foamed material, secured in place about its outer periphery.

BACKGROUND ART

Thermal insulation vacuum panels are known in the art.

One such panel is disclosed in U.S. Pat. No. 2,768,046. That panel comprises a metal shell or envelope formed from a pan-shaped metal sheet and a generally flat metal sheet. The sheets are welded to one another at their abutting outer edges. The edges define a flange which extends about the outer periphery of the panel. The space between the two sheets is filled with glass fiber insulation and the enclosed spaced is evacuated to a very low pressure.

The patentee teaches incorporating a plurality of his panels into a refrigerator cabinet. He notes in column 1, lines 45–49 of the '046 patent that heat transfer can occur from one wall or sheet of the panel to the other at the abutting edges of the sheets. In an attempt to minimize the effect of such edge leakage, the patentee teaches providing glass fiber insulation in areas adjacent to the edges of the panels.

Vacuum insulation panels having uniform edge dimensions can be difficult to manufacture. Dimensional error may occur during one or more of the following manufacturing operations: cutting or otherwise forming the first and second sections of the metal envelope, positioning the two sections adjacent to one another and welding their abutting edges together, and evacuating the envelope.

Since these panels have thin peripheral flanges, these panels have also been found difficult to handle and transport. Finally, because the panels are formed in part by a metal envelope, it is costly to make available to the end user a large selection of panel sizes.

Accordingly, there is a need in the art for a thermal insulation vacuum panel which has improved thermal performance, can be manufactured so as to have uniform edge dimensions, can be easily manufactured in a number of panel sizes, and permits it to be easily and safely handled and transported.

DISCLOSURE OF INVENTION

These needs are met by the present invention whereby an enhanced thermal insulation vacuum panel is provided which comprises a vacuum panel provided with an outer peripheral frame, preferably formed of a foamed material. The foam frame enhances the thermal properties of the vacuum panel, provides a means to easily vary the outer dimensions of the panel without requiring a change in the size of the metal envelope, improves the overall strength of the panel, allows the panel to be handled and shipped more easily and safely, and provides a means for maintaining uniform outer dimensions from panel to panel.

In accordance with a first aspect of the present invention, the enhanced thermal insulation vacuum panel comprises a thermal insulation vacuum panel, and a framing structure secured to at least a portion of the outer periphery of the panel.

Preferably, the framing structure extends about substantially the entire extent of the outer periphery of the thermal insulation panel. However, it is also contemplated that the framing structure may be secured to only one or more portions of the outer periphery of the vacuum panel. For example, the framing structure may comprise one or more polymeric corner sections which are secured to a like number of corner portions of the vacuum panel.

In one embodiment, the framing structure is formed from a material selected from the group consisting of polyurethane foam material, polystyrene foam material and phenolic foam material. However, non-foamed polymeric materials, wood, or other materials having similar characteristics may be used.

The framing structure may be preformed and subsequently adhesively or frictionally secured to the vacuum panel. Alternatively, the framing structure may be foamed or molded about the outer periphery of the panel.

In an alternative embodiment, a reinforced plastic structure is secured to at least a portion of an outer edge of the framing structure. The reinforced structure may define an attachment surface to which, for example, an inner liner and/or an outer skin of a refrigerator enclosure are secured either adhesively or via securing screws which pass through the reinforced structure.

The framing structure may have an L-shaped profile in cross section to permit it to mate with an adjacent enhanced panel.

In accordance with a second aspect of the present invention, an enhanced thermal insulation vacuum panel is provided. The enhanced panel comprises a thermal insulation vacuum panel formed in part by an envelope having an outer periphery and polymeric framing structure secured to at least a portion of the outer periphery of the panel envelope.

Accordingly, it is an object of the present invention to provide an enhanced thermal insulation vacuum panel. It is further an object of the present invention to provide an enhanced thermal insulation vacuum panel which comprises a thermal insulation vacuum panel provided with an outer peripheral frame. It is another object of the present invention to provide an enhanced thermal insulation vacuum panel which comprises a thermal insulation vacuum panel provided with an outer peripheral polymeric frame.

These and other objects of the present invention will be apparent from the following description, the accompanying drawings and the appended claims.

MODES FOR CARRYING OUT THE INVENTION

Figure 1:
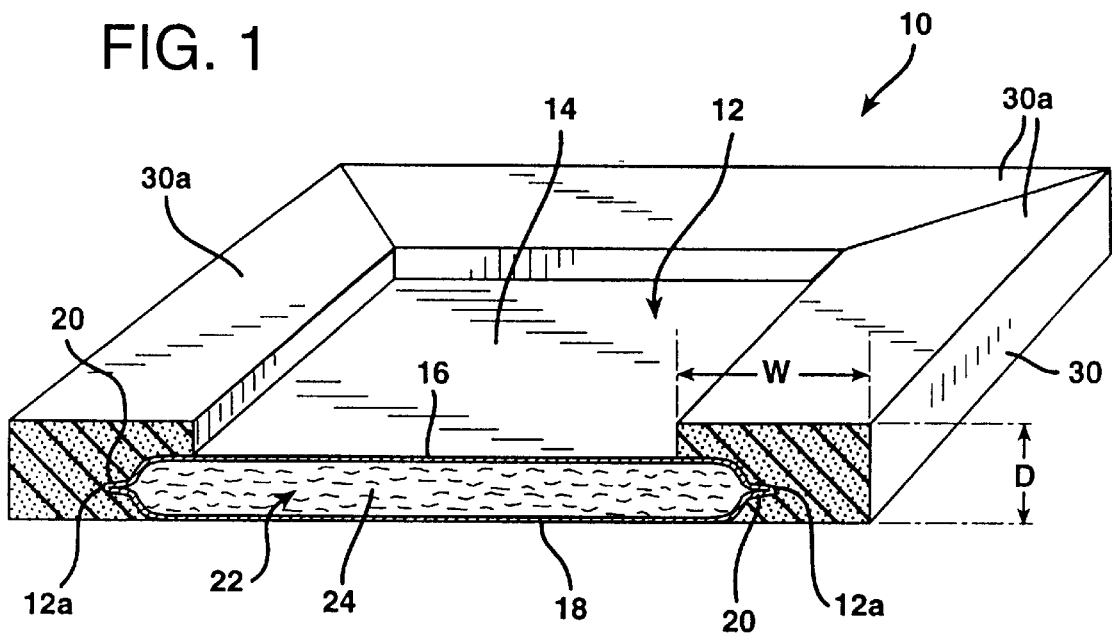
FIG. 1 is a perspective view, partially in cross section, of an enhanced thermal insulation vacuum panel formed in accordance with a first embodiment of the present invention.

Referring now to FIG. 1, there is shown generally at 10 an enhanced thermal insulation vacuum panel formed in accordance with the present invention. The enhanced insulation panel 10 is adapted for use in insulated appliances, such as ovens, dishwashers, refrigerators and freezers, walk-in coolers, recreational vehicles, insulated vans or trucks, and refrigerated shipping containers. It is also contemplated that the enhanced panel 10 may be used in the construction of insulated walls and/or ceilings of permanent or temporary structures.

The enhanced panel 10 comprises a high R-value thermal insulation vacuum panel 12, which may be constructed as disclosed in any one of: U.S. patent application Ser. No. 08/271,163, filed Jul. 6, 1994, and entitled "Vacuum Insulation Panel and Method For Manufacturing"; U.S. patent application Ser. No. 08/405,129, filed Mar. 16, 1995, and entitled "Vacuum Insulation Panel Having Blended Glass Wool Filler and Method for Manufacturing"; U.S. patent application Ser. No. 08/405,114, filed Mar. 16, 1995, and entitled "Vacuum Insulation Panel Having Expanded Surface Area Wool Filler and Method for Manufacturing"; and U.S. Pat. Nos. 5,330,816, 5,286,320, 5,094,899 and 5,090,981, the disclosures of which are incorporated herein by reference.

The vacuum panel 12 comprises a generally rectangular metal shell or envelope 14 formed from upper and lower metal panels 16 and 18. The panels 16 and 18 are welded to one another at their abutting outer edge portions. The abutting outer edge portions form a flange 20 which defines the outer periphery 12a of the panel 12. The space 22 between the two panels 16 and 18 is filled with thermal insulating media 24 and the enclosed space is evacuated to a very low pressure.

A framing structure 30 is secured about the outer periphery 12a of the vacuum panel 12. In the embodiment illustrated in FIG. 1, the framing structure 30 comprises discrete framing members 30a which are adhesively, frictionally or otherwise fastened or joined to one another and to the outer periphery 12a of the vacuum panel 12. Preferably, the members 30a are preformed from a foamed material, such as a polyurethane or a polystyrene foam material, and are adhesively applied to the vacuum panel 12. While not shown in the illustrated embodiment, reinforcement materials, such as glass fibers, may be included in the foamed material. It is also contemplated that the polymeric material, rather than being preformed, may be foamed about the outer periphery 12a of the vacuum panel 12 or a non-foamed polymeric material may be molded about the outer periphery 12a of the vacuum panel 12. The foamed or molded material may encase only the outer periphery 12a of the panel 12, in the same manner that members 30a encase the outer periphery 12a of the panel 12 as shown in FIG. 1. Alternatively, the foamed or molded material may cover essentially the entire outer surface of the panel 12 and material may be scalloped or otherwise removed from one or both sides of the enhanced panel 10 to reduce the thickness of the enhanced panel 10 in its central region.

It is further contemplated that the framing structure 30 may be formed from discrete framing members preformed from a fiberglass reinforced plastic such as a polyester-based sheet molding compound (SMC), a rigid unreinforced polymeric material such as high density polyethylene, a coated metal, wood, etc. Processes for forming discrete framing members from polymeric materials include molding, extrusion, and pultrusion processes. It is additionally contemplated that the framing structure 30 may be secured to only one or more portions of the outer periphery 12a of the vacuum panel 12. For example, the framing structure 30 may comprise one or more polymeric corner sections (not shown) which are secured to only corner portions of the vacuum panel.

The width W, depth D and length of the framing structure 30 can be easily varied, such as by cutting or grinding or by using forming apparatus of a different shape and/or size. Accordingly, metal envelopes 14 having the same outer dimensions may be used in the manufacture of enhanced vacuum panels 10 having different outer dimensions. This substantially reduces the cost of producing panels 10 having different outer dimensions since separate sets of tooling and other apparatus for forming metal envelopes of two different sizes are not required.

Vacuum insulation panels having metal envelopes of uniform edge dimensions can be difficult to manufacture, as discussed above in the "Background Art" portion of the present application. This is in contrast to framing structures 30, which can easily be formed having uniform outer dimensions. Accordingly, with the present invention, it is possible to economically manufacture enhanced thermal insulation vacuum panels 10 having uniform outer dimensions, even though their metal envelopes 14 may have non-uniform dimensions.

Figure 2:
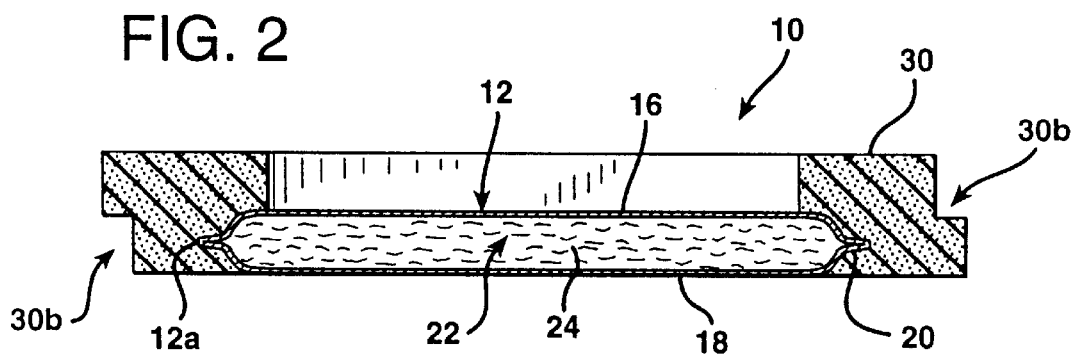
FIG. 2 is a cross sectional view of an enhanced thermal insulation vacuum panel formed in accordance with a second embodiment of the present invention.

As shown in FIG. 2, the framing structure 30 may have an L-shaped or stepped profile 30b in cross section to permit adjacent framing structures 30 of like panels 10 to intermate to facilitate the interconnecting of the adjacent panels 10. One of the benefits of the framing structure 30 of the enhanced panel 10 is the formability of the edge profile for customer applications. Other profile shapes not specifically shown herein may also be employed, including interlocking as well as mating profiles.

Figure 3:
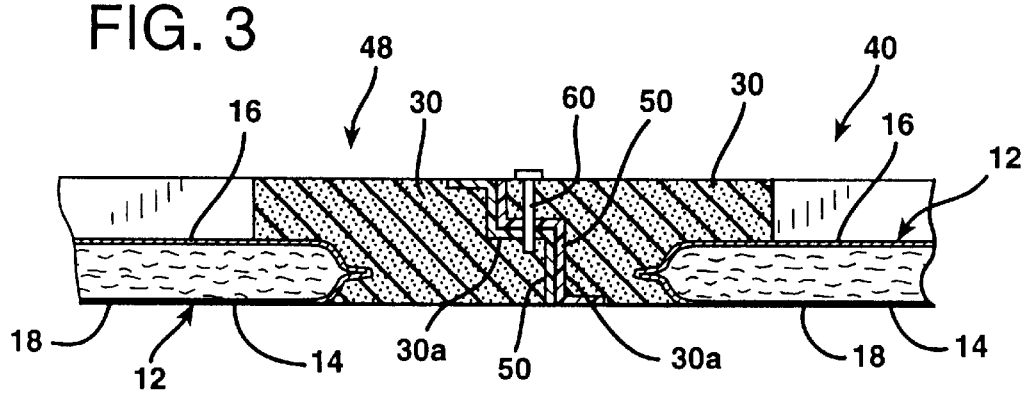
FIG. 3 is a detailed cross sectional view of two enhanced thermal insulation vacuum panels formed and joined in accordance with a third embodiment of the present invention.

An enhanced thermal insulation vacuum panel 40, formed in accordance with a second embodiment of the present invention, will now be described with reference to FIG. 3, where like elements are referenced by like numerals. In this embodiment, a reinforced plastic structure 50 is secured about the outer periphery 30a of the framing structure 30. In the embodiment illustrated in FIG. 3, the outer periphery of each panel 40 has an L-shaped or stepped profile and portions of their outer peripheries are shown overlapping one another. One or more securing screws 60 extend through the respective framing structures 30 and the reinforcement plastic structures 50 of the adjacent panels 40 to connect the two panels 40 together. In this embodiment, the reinforced structures 50 provide strong layers into which the one or more screws 60 extend and, hence, improves fastener retention over foam alone. Alternatively, the reinforcement plastic structure 50 may define an attachment surface to which, for example, an inner and an outer wall or surface (not shown) are secured.

It is further contemplated that a framing structure 30 of enhanced panels 10 may be formed from a high density foamed material, e.g., a 10 pounds/ft$^3$ (160 kg/m$^3$) foamed material, so as to improve its strength and fastener retention ability.

Accordingly, the present invention provides an enhanced thermal insulation vacuum panel which comprises a thermal insulation vacuum panel provided with an outer peripheral frame, preferably formed of a foamed material. The foam frame enhances the thermal properties of the vacuum panel, provides a means to easily vary the outer dimensions of the panel without requiring a change in the size of the metal envelope, improves the overall strength of the panel, allows the panel to be handled and shipped more easily and safely, and provides a means for maintaining uniform outer dimensions from panel to panel.

Having described the invention in detail and by reference to the preferred embodiments thereof, it will be apparent that other modifications and variations are possible without departing from the scope of the invention defined in the appended claims.

We claim:

1. An enhanced thermal insulation vacuum panel comprising:
   a thermal insulation vacuum panel comprising an envelope having an outer periphery and insulating media contained in said envelope; and
   framing structure extending about substantially the entire extent of the outer periphery of said envelope, secured to at least a portion of said outer periphery of said envelope and encasing substantially only said outer periphery of said envelope.

2. An enhanced thermal insulation vacuum panel as set forth in claim 1, wherein said framing structure comprises at least first and second corner sections which are secured to first and second corner portions of said vacuum panel.

3. An enhanced thermal insulation vacuum panel as set forth in claim 1, further including adhesive for securing said framing structure to said portion of said panel.

4. An enhanced thermal insulation vacuum panel as set forth in claim 1, wherein said framing structure is molded about the outer periphery of said panel.

5. An enhanced thermal insulation vacuum panel as set forth in claim 1, wherein said framing structure has an L-shaped profile in cross section.

6. An enhanced thermal insulation vacuum panel as set forth in claim 1, wherein said insulating media comprises glass fiber material.

7. An enhanced thermal insulation vacuum panel comprising:
   a thermal insulation vacuum panel having an outer periphery; and
   framing structure extending about substantially the entire extent of the outer periphery of said thermal insulation panel, secured to at least a portion of said outer periphery of said panel and encasing substantially only said outer periphery of said panel, wherein said framing structure is formed from a material selected from the group consisting of polyurethane foam material, polystyrene foam material and phenolic foam material.

8. An enhanced thermal insulation vacuum panel as set forth in claim 2, further comprising reinforced plastic structure secured to at least a portion of an outer edge of said framing structure.

9. An enhanced thermal insulation vacuum panel comprising:
   a thermal insulation vacuum panel having an outer periphery; and
   framing structure extending about substantially the entire extent of the outer periphery of said thermal insulation panel, secured to at least a portion of said outer Periphery of said panel and encasing substantially only said outer periphery of said panel, wherein said framing structure is foamed about the outer periphery of said panel.

10. An enhanced thermal insulation vacuum panel comprising:
    a thermal insulation vacuum panel comprising an envelope having an outer periphery and thermal insulating media contained in said envelope; and
    polymeric framing structure extending about substantially the entire extent of the outer periphery of said panel envelope, secured to at least a portion of said outer periphery of said panel envelope and encasing substantially only said outer periphery of said panel envelope.

11. An enhanced thermal insulation vacuum panel as set forth in claim 9, wherein said polymeric framing structure comprises at least first and second polymeric corner sections which are secured to first and second corner portions of said panel envelope.

12. An enhanced thermal insulation vacuum panel as set forth in claim 9, wherein said polymeric framing structure is formed from a material selected from the group consisting of polyurethane foam material, polystyrene foam material and phenolic foam material.

13. An enhanced thermal insulation vacuum panel as set forth in claim 12, further comprising reinforced plastic structure secured to at least a portion of an outer edge of said polymeric framing structure.

14. An enhanced thermal insulation vacuum panel as set forth in claim 10, further including adhesive for securing said framing structure to said portion of said panel envelope.

15. An enhanced thermal insulation vacuum panel as set forth in claim 10, wherein said framing structure is molded about the outer periphery of said panel envelope.

16. An enhanced thermal insulation vacuum panel as set forth in claim 10, wherein said framing structure is foamed about the outer periphery of said panel envelope.

17. An enhanced thermal insulation vacuum panel as set forth in claim 10, wherein said framing structure has an L-shaped profile in cross section.

18. An enhanced thermal insulation vacuum panel as set forth in claim 10, wherein said insulating media comprises glass fiber material.

* * * * *

UNITED STATES PATENT AND TRADEMARK OFFICE
CERTIFICATE OF CORRECTION

PATENT NO. : 5,897,932

DATED : April 27, 1999

INVENTOR(S): Ralph McGrath, Ralph Jutte

It is certified that error appears in the above-identified patent and that said Letters Patent is hereby corrected as shown below:

Title page, item [19] "McGarth et al." should be --McGrath et al.--

On title page, item [75]
First inventor's name:
Should as follows,
    --Ralph McGrath--

Signed and Sealed this

Fifth Day of October, 1999

Attest:

Q. TODD DICKINSON

Attesting Officer    *Acting Commissioner of Patents and Trademarks*